US012733082B2

(12) United States Patent
Mayr

(10) Patent No.: US 12,733,082 B2
(45) Date of Patent: Sep. 8, 2026

(54) EMERGENCY LUMINAIRE, METHOD FOR CONTROLLING LIGHT EMISSION OF AN EMERGENCY LUMINAIRE AND AN EMERGENCY SIGN UNIT

(71) Applicant: ZUMTOBEL LIGHTING GMBH, Dornbirn (AT)

(72) Inventor: Gregor Mayr, Gaiβau (AT)

(73) Assignee: Zumtobel Lighting GmbH, Dornbirn (AT)

(*) Notice: Subject to any disclaimer, the term of this patent is extended or adjusted under 35 U.S.C. 154(b) by 312 days.

(21) Appl. No.: 18/569,390

(22) PCT Filed: Jun. 24, 2022

(86) PCT No.: PCT/EP2022/067332

§ 371 (c)(1),
(2) Date: Dec. 12, 2023

(87) PCT Pub. No.: WO2023/280594

PCT Pub. Date: Jan. 12, 2023

(65) Prior Publication Data

US 2024/0268010 A1 Aug. 8, 2024

(30) Foreign Application Priority Data

Jul. 8, 2021 (EP) .................................... 21184422

(51) Int. Cl.
*G09F 13/04* (2006.01)
*G09F 13/00* (2006.01)
(Continued)

(52) U.S. Cl.
CPC ........... *H05B 47/17* (2020.01); *G09F 13/005* (2013.01); *G09F 13/049* (2021.05); *G09F 13/18* (2013.01);
(Continued)

(58) Field of Classification Search
CPC ...... G09F 13/005; G09F 13/049; G09F 13/18; G09F 2013/05; G09F 2013/1872; G09F 2007/005; F21S 9/022
See application file for complete search history.

(56) References Cited

U.S. PATENT DOCUMENTS 6,539,657 B1 * 4/2003 Qualls, Jr. ............ G02B 6/0091 40/546
9,589,487 B1 * 3/2017 Kasler ..................... G09F 13/18
(Continued)

FOREIGN PATENT DOCUMENTS

JP 07240104 A * 9/1995
JP H07240104 A 9/1995

OTHER PUBLICATIONS

1 PCT/EP2022/067332, International Search Report and Written Opinion dated Oct. 5, 2022, 9 pages.

*Primary Examiner* — Gary C Hoge
(74) *Attorney, Agent, or Firm* — Andrus Intellectual Property Law, LLP

(57) ABSTRACT

The invention relates to an emergency luminaire (1) with a housing (2) accommodating a light source (3) and control means (4) configured to control light emission of the light source (3). The housing (2) is configured for attaching an emergency sign unit (5) to the housing (2) such that the light emitted by the light source (3) lights the emergency sign unit (5) when the emergency sign unit is (5) attached. The control means (4) is configured to determine whether the emergency sign unit (5) is attached to the housing (2) or not; and control the light emission of the light source (3) according to a first operation mode when no emergency sign unit (5) is attached to the housing (2), and according to a second operation mode when the emergency sign unit (5) is attached to the housing. The second operation mode is different from the first operation mode.

14 Claims, 5 Drawing Sheets

(51) Int. Cl.
*G09F 13/18* (2006.01)
*H05B 47/17* (2020.01)
*G08B 5/36* (2006.01)

(52) U.S. Cl.
CPC ............ *G08B 5/36* (2013.01); *G09F 2013/05* (2021.05); *G09F 2013/184* (2013.01); *G09F 2013/1872* (2013.01); *G09F 2013/1886* (2013.01)

(56) References Cited

U.S. PATENT DOCUMENTS

| | | | | |
|---|---|---|---|---|
| 2010/0275478 | A1* | 11/2010 | Kuan ...................... | G09F 13/18 40/553 |
| 2012/0124873 | A1* | 5/2012 | Lee ......................... | G09F 13/18 40/541 |
| 2021/0175960 | A1 | 6/2021 | Hall et al. | |

* cited by examiner

EMERGENCY LUMINAIRE, METHOD FOR CONTROLLING LIGHT EMISSION OF AN EMERGENCY LUMINAIRE AND AN EMERGENCY SIGN UNIT

CROSS-REFERENCE TO RELATED APPLICATION

The present application is the U.S. national stage application of international application PCT/EP2022/067332 filed Jun. 24, 2022, which international application was published on Jan. 12, 2023 as International Publication WO 2023/280594 A1. The international application claims priority to European Patent Application 21184422.0, filed Jul. 8, 2021.

TECHNICAL FIELD OF THE INVENTION

The invention relates to an emergency luminaire, a method for controlling light emission of an emergency luminaire and an emergency sign unit.

BACKGROUND OF THE INVENTION

In the prior art, emergency luminaires are well known. An emergency luminaire is configured to provide light emission to an area (e.g. of a building or outside area), in which the emergency luminaire is arranged, in case an emergency operation state is present. For example, an emergency luminaire may provide light to an escape route in case of the emergency operation state. The emergency operation state corresponds to a state during which electrical energy supply from mains malfunctions or fails due to an emergency situation. Such an emergency situation may comprise or correspond to a fire in a building leading to interruption of electrical energy supply from mains in a part of the building or the whole building; mains failure etc. Mains may provide an AC voltage of 230 V with a frequency of 50 Hz or 60 Hz.

For the electrical energy supply in case of the emergency operation state the emergency luminaire is configured to be electrically supplied from an electrical energy storage (e.g. one or more batteries, which are optionally rechargeable). The emergency luminaire may comprise such an electrical energy storage. Optionally, the emergency luminaire may further comprise a charging circuit in case the electrical energy storage is rechargeable, wherein the charging circuit is configured to charge the electrical energy storage when a normal operation state is present. The normal operation state corresponds to a state during which mains electrical supplies the emergency luminaire, i.e. during which there is not malfunction or failure of the electrical energy supply from mains. Thus, the emergency luminaire may either be in the normal operation state (i.e. electrical energy is supplied from mains) or in the emergency operation state (i.e. sufficient electrical energy for the operation of the emergency luminaire cannot be supplied from mains).

An emergency luminaire may be used for displaying an emergency sign by attaching an emergency sign unit displaying the emergency sign to the housing of the emergency luminaire such that the emergency luminaire lights the emergency sign when the emergency sign unit is attached to the housing. Such an emergency luminaire may be referred to as emergency sign luminaire. Thus, the function of the emergency luminaire may be altered from mere lighting the environment to displaying an emergency sign that is lighted by the light emitted by the emergency luminaire respectively the function of the emergency luminaire may be extended to displaying an emergency sign that is lighted by light emitted by the emergency luminaire. For example, the emergency sign luminaire may indicate respectively inform on an escape route and/or an emergency exit using an lighted display of a respective emergency sign. In addition, the emergency sign luminaire may optionally provide light to the escape route or emergency exit.

For this different function of the emergency luminaire (i.e. lighting an emergency sign of an emergency sign unit, when an emergency sign unit is attached to the housing of the emergency luminaire) the initial function, such as light emission, of the emergency luminaire needs to be adapted. This requires a person (e.g. maintenance responsible or electrician) to re-configure respectively adapt the function of the emergency luminaire. In particular, in the case of adding an emergency sign unit to a plurality of emergency luminaires (e.g. hundreds of emergency luminaires) in a building, this may result in a time consuming and expensive process of changing the function of the plurality of emergency luminaires.

SUMMARY OF THE INVENTION

Therefore, it is an object of the invention to provide an emergency luminaire that may be transformed to an emergency sign luminaire without the above described disadvantages. It is in particular an object of the invention to provide an emergency luminaire, which allows reducing time and effort of transforming an emergency luminaire to an emergency sign luminaire.

These and other objects, which become apparent upon reading the following description, are solved by the subject-matter of the independent claims. The dependent claims refer to preferred embodiments of the invention.

According to a first aspect of the invention, an emergency luminaire with a housing is provided. The housing accommodates a light source configured to emit light, and control means configured to control light emission of the light source. The housing is configured for attaching an emergency sign unit to the housing such that the light emitted by the light source lights the emergency sign unit when the emergency sign unit is attached to the housing. The control means is configured to determine whether the emergency sign unit is attached to the housing or not. The control means is configured to control the light emission of the light source according to a first operation mode when no emergency sign unit is attached to the housing, and according to a second operation mode when the emergency sign unit is attached to the housing. The second operation mode is different from the first operation mode.

Thus, the first aspect of the invention proposes providing an emergency luminaire with control means, wherein the control means is configured to determine whether an emergency sign unit is attached to the housing of the emergency luminaire or not. The control means is further configured to switch between a first operation mode when no emergency sign unit is attached and a second operation mode when the emergency sign unit is attached, wherein the first operation mode and the second operation mode are different from each other.

Therefore, the control means automatically detects when the emergency sign unit is attached to the housing of the luminaire and adapts the operation of the luminaire by changing from the first operation mode to the second operation mode for controlling the light emission of the light source of the luminaire. In other words, the control means is configured to determine whether the emergency luminaire is transformed into an emergency sign luminaire by attaching an emergency sign unit to the housing of the emergency luminaire. When this is the case, the control means is configured to automatically switch from the first operation mode to the second operation mode. The attachment of the emergency sign unit to the emergency luminaire's housing may be detachable. Thus, in case an emergency sign unit is already attached to the luminaire's housing, the control means may detect when the emergency sign unit is detached from the housing. The control means is configured to automatically switch from the second operation mode to the first operation mode when this is the case.

The first operation mode may be also referred to as "emergency luminaire operation mode" or "emergency luminaire mode". The second operation mode may be also referred to as "emergency sign luminaire operation mode" or "emergency sign luminaire mode".

Therefore, the emergency luminaire reduces time and effort needed for transforming the emergency luminaire to an emergency sign unit, because no person is required for adapting the function of the emergency luminaire when an emergency sign unit is attached to the housing of the emergency luminaire. It is sufficient to attach the emergency sign unit to the housing of the emergency luminaire for transforming the emergency luminaire to an emergency sign luminaire. Namely, as outlined above, the control means of the emergency luminaire is configured to determine whether an emergency sign unit is attached to the housing of the luminaire and, thus, whether an adaption of the function of the emergency luminaire is needed. For adapting the function of the emergency luminaire, the control means is configured to control the light emission by the light source of the luminaire according to the first operation mode when no emergency sign unit is attached to the luminaire's housing (i.e. the emergency luminaire is to be operated as an emergency luminaire). Further, for adapting the function of the emergency luminaire the control means is configured to control the light emission of the light source of the luminaire according to the second operation mode when the emergency sign unit is attached to the luminaire's housing (i.e. the emergency luminaire is to be operated as an emergency sign luminaire). The above correspondingly applies for transforming the emergency luminaire being already an emergency sign unit back to a mere emergency luminaire. For this, it is sufficient to detach the emergency sign unit from the housing of the emergency luminaire.

The housing may be adapted to provide a protection for the components enclosed by the housing against environmental influences, such as dust and water. The housing may be a housing according to the IP standard (International Protection/Ingress Protection standard, IEC standard 60529) respectively IP code. The IP code comprises two digits, wherein the first digit indicates the degree of solid particle protection and the second digit indicates the degree of liquid ingress protection. Optionally, the housing may be an IP40 housing, i.e. a housing providing IP40 protection for the components enclosed by the housing. The components of the emergency luminaire may be arranged in the housing respectively be enclosed by the housing. Optionally, at least one component of the emergency luminaire may be attached on the surface of the housing. The housing is configured for attaching the emergency sign unit to the housing without an effect on the protection, in particular IP protection, provided by the housing.

The light source may be referred to as electrical light source. The light emission of the light source may be controllable by the amount of electrical energy supplied to the light source. The light source may comprise or correspond to one or more light emitting diodes (LEDs). The one or more light emitting diodes may be electrically supplied with a current (operating current). Thus, the control means of the emergency luminaire may be configured to control the one or more LEDs of the light source by controlling the current supplied to the one or more LEDs. The one or more LEDs may correspond to one or more organic LEDs, one or more inorganic LEDs and/or one or more other LEDs known in the art. The light source may be configured to emit colored light, optionally light of at least two colors. The light source may comprise or correspond to at least one LED module comprising one or more LEDs. The light source may comprise or correspond to a LED module comprising a plurality of LEDs. The light source may comprise or correspond to an array of a plurality of LEDs. The light source may comprise an optical arrangement comprising one or more lenses, optional one or more Fresnel lenses, for altering the light emitted by the one or more LEDs. The LEDs of the light source may form one or more LED spots.

The light source may be arranged in the housing such that the light emitted by the light source lights the emergency sign unit, when the emergency sign unit is attached to the housing. Alternatively or additionally, the light source may be arranged at least partly on a surface of the housing such that the light emitted by the light source lights the emergency sign unit, when the emergency sign unit is attached to the housing.

The control means may comprise or correspond to a processor, microprocessor, controller, microcontroller, field programmable gate array (FPGA), application specific integrated circuit (ASIC) or any combination thereof.

The control means may be configured to control the light emission of the light source by controlling the electrical energy supplied to the light source. The greater the electrical energy supplied to the light source the greater the light intensity of the light emitted by the light source and vice versa. Thus, the greater the current supplied to the light source the greater the light intensity of the light emitted by the light source and vice versa. In an undimmed state of the light source, the light source emits light with maximum light intensity. The higher the dimming level of the light emitted by the light source the greater the amount of light respectively the greater the light intensity emitted by the light source. The dimming level may be between zero percent (0%) and one hundred percent (100%), wherein in case of a dimming level of 0% no light is emitted by the light source and in case of a dimming level of 100% light having the maximum light intensity of the light source is emitted.

In particular, the control means may be configured to control the light emission of the light source by controlling an electrical supply circuit of the emergency luminaire for electrically supplying the light source. The electrical supply circuit may also be referred to as electrical power supply circuit. In particular, the control means may be configured to control the amount of electrical energy supplied by the electrical supply circuit to the light source for controlling the light emission of the light source. The housing of the emergency luminaire may accommodate the electrical supply circuit.

The emergency luminaire may comprise an electrical energy storage (e.g. one or more batteries) for electrically supplying the light source. The electrical energy storage may be a part of the electrical supply circuit or may be electrically connected thereto. The electrical energy storage may be rechargeable. The emergency luminaire, optional the electrical supply circuit, may comprise a charging circuit for charging the electrical energy storage. The control means may be configured to control the charging circuit such that the charging circuit charges the electrical energy storage with electrical energy from mains in the normal operation state. The emergency luminaire may be configured to be electrically connected to mains. The electrical supply circuit may be configured to receive electrical energy from mains for electrically supplying the light source, when the emergency luminaire is electrically connected to mains. The optional charging circuit may be configured to receive electrical energy from mains for charging the electrical energy storage, when the emergency luminaire is electrically connected to mains.

The electrical supply circuit may comprise or correspond to at least one converter configured for providing electrical energy to the light source. The at least one converter may be configured for power conversion. In particular, the at least one converter may be configured to convert a first voltage or current to a second voltage or current, wherein the second voltage respectively current is greater or smaller than the first voltage respectively current depending on the type of converter. The at least one converter may be configured to provide electrical energy from mains to the light source mains in the normal operation state and electrical energy from the electrical energy storage to the light source in the emergency operation state. The electrical supply circuit may comprise or correspond to at least one converter configured for providing electrical energy to the light source from mains and at least one converter configured for providing electrical energy to the light source from the electrical energy storage. Examples of converters comprise actively controlled converters that are controllable by the control means, such as boost converters, buck converters, flyback converters, resonant converters or any other known converter types. The at least one converter may comprise or correspond to at least on AC/DC converter and/or at least one DC/DC converter. The electrical supply circuit optionally may comprise one or more filters (e.g. low pass filters, electromagnetic interference (EMI) filters etc.), one or more rectifier circuits (e.g. half-bridge rectifiers, full-bridge rectifiers, etc.) and/or one or more power factor correction (PFC) circuits (e.g. active PFC circuits, passive PFC circuits etc.).

Optionally, the electrical supply circuit comprises or corresponds to an operating module respectively ballast for operating lighting means (such as LEDs). The control means may be part of the operating module.

In particular, the control means may be configured to control the electrical supply circuit such that the electrical supply circuit supplies electrical energy to the light source from mains in the normal operation state and from the electrical energy storage in the emergency operation state. The control means may be configured to determine, based on the state of mains, whether the emergency operation state or the normal operation state is present. In particular, the control means may be configured to determine whether the emergency operation state or the normal operation is present by determining whether the electrical energy supply from mains functions or not. For example, the control means may determine that the electrical energy supply from mains functions in case the electrical energy, voltage and/or current supplied from mains are equal to or greater than a corresponding threshold value.

The control means may be configured to communicate with extern (i.e. with external components outside the emergency luminaire). This communication may be wire-bound and/or wireless. For this, the emergency luminaire may comprise a communication interface. The control means may be configured to control operation of the emergency luminaire based on information received from extern. For example, the control means may be configured to determine based on information received from extern whether the normal operation state or the emergency operations state is present.

The housing may be configured for detachably attaching the emergency sign unit to the housing. That is, the emergency sign unit may be detached again after being attached to the housing. The housing may comprise attachment means for attaching the emergency sign unit to the housing. For example, the housing may comprise one or more attachment openings in the surface for receiving one or more attachment parts of the emergency sign unit. The one or more attachment openings may be sealed respectively covered by one or more corresponding covers, when no emergency sign unit is attached to the housing. The one or more covers may be blind covers. The one or more attachment parts of the emergency sign unit are configured to be at least partly arranged in the one or more attachment openings of the emergency luminaire's opening and mechanically fixed therein, in order to attach the emergency sign unit to the housing of the emergency luminaire. This fixing may be a detachable fixing. The attachment means of the housing may be configured for attaching the emergency sign unit by means of a click connection, snap-in connection, slide-in connection or any other connection known in the art. The attachment means of the emergency luminaire may be configured to form a form-fit and/or force-fit connection with the emergency sign unit for attaching the emergency sign unit to the housing. In particular, the attachment means may be configured to form a form-fit and/or force-fit connection with corresponding attachment means of the emergency sign unit for attaching the emergency sign unit to the housing.

The emergency sign unit may be at least partly translucent. The emergency sign unit may comprise or be made of translucent material (e.g. glass, acrylic glass etc.). The emergency sign unit may display at least one emergency sign on at least one surface of the emergency sign unit. The at least one emergency sign may comprise or correspond to a pictogram. The emergency sign unit is configured to be attached to the housing of the emergency luminaire such that the light emitted by the light source of the emergency luminaire lights the emergency sign of the at least one surface of the emergency sign unit when the emergency sign unit is attached to the housing.

The term “safety sign” may be used as a synonym for the term “emergency sign”. The terms “safety sign” and “emergency sign” may be understood as referring to a sign that provides information to a person for increasing the safety of the person in an emergency situation. For example, an exit sign indicates the nearest exit for a person, thus, providing a safe exit of an area in an emergency situation. An escape route sign indicating an escape route provides safety to the person in that it allows the person to escape in an emergency situation. Thus, the at least one emergency sign may comprise or correspond to an exit sign and/or an escape route sign.

The emergency sign unit may comprise or correspond to a light guide, wherein the emergency sign unit is configured to be attached to the housing such that light emitted by the light source of the emergency luminaire is emitted through the light guide. The light emitted through the light guide lights the at least one emergency sign of the at least one surface of the emergency sign unit.

The emergency sign unit may comprise or correspond to a plate with at least one emergency sign on at least one surface of the plate. The plate may be at least partly translucent, such that light emitted by the light source of the emergency luminaire is emitted through the plate, when the emergency sign unit is attached to the housing of the emergency luminaire. In particular, the light emitted through the plate lights the emergency sign of the at least one surface of the plate. The plate may be a light guide plate. The emergency sign unit is configured to be attached to the housing of the emergency luminaire such that the light emitted by the light source of the emergency luminaire lights the at least one emergency sign of the at least one surface of the plate when the emergency sign unit is attached to the housing.

The emergency sign unit may comprises an optical structure configured to generate from the light emitted by the light source of the emergency luminaire narrow beam light when the emergency sign unit is attached to the housing of the emergency luminaire. This allows transforming wide beam light that may be emitted by the light source of the emergency luminaire to narrow beam light for lighting the emergency sign unit. The light source of the emergency luminaire may be configured to emit wide beam light. This allows lighting the environment of the emergency luminaire (e.g. a room in which the luminaire is installed) with a wide beam light, when no emergency sign unit is attached to the housing. The wide beam light prevents dazzling of persons and, thus, prevents panic of the person in the case of the emergency operation state. Therefore, the wide beam light may also be referred to as anti-panic light.

The housing may accommodate detection means 10*a*, FIG. 1*a* for detecting attachment of the emergency sign unit to the housing. The control means may be configured to determine, using the detection means, whether the emergency sign unit is attached to the housing or not.

The control means may comprise the detection means 10*b*, FIG. 1*b*. Alternatively, the control means may be electrically connected to the detection means. Optionally, the control means may receive electrical signals from the detection means. The control means may be configured to apply electrical current and/or voltage to the detection means.

Optionally, the detection means comprises or corresponds to two electrical contacts 10*b*, FIG. 1*b* that are configured to be electrically connected to each other by an electrical conductive element 11*b* of the emergency sign unit, when the emergency sign unit is attached to the housing. The control means may be configured to determine that the emergency sign unit is attached to the housing when the two electrical contacts 10*b* are electrically connected to each other.

Thus, the detection of the emergency sign unit may be implemented in a cost effective way.

The two electrical contacts may correspond to two inputs of the control means. Alternatively, the two electrical contacts may be electrically connected to at least one input of the control means.

Optionally, the detection means 10*a*, FIG. 1*a* is configured to detect using electromagnetic induction a near field communication (NFC) tag, a metal element and/or a magnetic element (see 10*b* in FIG. 1*b*) of the emergency sign unit, when the emergency sign unit is attached to the housing. The control means may be configured to determine that the emergency sign unit is attached to the housing when the detection means detects the NFC tag, the metal element and/or the magnetic element of the emergency sign unit.

Thus, the detection of the emergency sign unit may be implemented in a wireless way. This allows to seal the control means and detection means in the housing of the emergency luminaire to protect them against environmental influences, such as water and dust.

In particular, the control means may be configured to control the light emission of the light source according to the first operation mode such that in a normal operation state of the first operation mode the light source does not emit light, and in an emergency operation state of the first operation mode the light source emits light having a first light intensity.

The control means is configured to control the light emission of the light source of the emergency luminaire according to the first operation mode in case no emergency sign unit is attached to the housing. The control means is configured to control the light source according to the first operation mode such that the light source of the emergency luminaire provides the function of an emergency luminaire. This is providing light to the environment of the emergency luminaire in of emergency operation state. That is, in the emergency operation state of the first operation mode, the light source emits light to the environment of the emergency luminaire in order to provide (emergency) lighting of the environment.

In the normal operation state the electrical supply from mains functions. Therefore, in the normal operation state of the first operation mode, the normal lighting of an area (a room of a building or outdoor area), in which the emergency luminaire may be installed, is electrically supplied from mains and, thus, may function normally. As a result, in the normal operation state of the first operation mode the emergency luminaire does not need to emit light. This reduces energy consumption and saves costs. In addition, this prevents in the normal operation state persons being dazzled by light emitted from the light source of the emergency luminaire.

The light source emitting light having the first light intensity corresponds to the light source emitting light at a first dimming level. As outlined already above, a dimming level of zero percent (0%) correspond to no light emission and a dimming level of one hundred percent (100%) correspond to emission of undimmed light. That is, the smaller the dimming level of the emitted light the smaller the light intensity of the emitted light and vice versa. The first dimming level may equal to a dimming level of hundred percent (100%). Thus, light having the first light intensity may correspond to undimmed light emitted by the light source of the emergency luminaire.

As outlined already above, the normal operation state corresponds to a state during which sufficient electrical energy is supplied from mains to the emergency luminaire, when the emergency luminaire is connected to mains. The emergency operation state corresponds to a state during which the supply of electrical energy from mains malfunctions or fails, when the emergency luminaire is connected to mains. This may be due to an emergency situation. For example, in case of a fire in a building the electrical energy supply from mains may fail in a part of the building or the whole building, in which the emergency luminaire may be installed. Another example of an emergency situation is mains failure (e.g. due to bad weather or a power station stops providing electrical energy).

Further, the control means may be configured to control the light emission of the light source according to the second operation mode such that in a normal operation state of the second operation mode the light source emits light having a second light intensity, and in the emergency operation state of the second operation mode the light source emits light having a third light intensity. The second light intensity is greater than the third light intensity.

The control means is configured to control the light emission of the light source of the emergency luminaire according to the second operation mode in case the emergency sign unit is attached to the housing. The control means may be configured to control the light source of the emergency luminaire according to the second operation mode such that the light source of the emergency luminaire provides the function of an emergency sign luminaire. This is lighting the emergency sign unit, in particular one or more emergency signs (exit sign and/or escape route sign) of the emergency sign unit, when the emergency sign unit is attached to the emergency luminaire's housing.

In the normal operation state, the power supply from mains functions and the normal lighting of an area (a room of a building or an outside area), in which the emergency luminaire may be installed, is electrically supplied from mains and, thus, may function normally. Therefore, the second light intensity of the light emitted by the light source in the normal operation state of the second operation mode is greater than the third light intensity of the light emitted by the light source in the emergency operation state of the second operation mode. This allows to sufficiently illuminate the emergency sign unit and, thus, the at least one emergency sign displayed by the emergency sign unit in the normal operation state so that the emergency sign unit is highlighted irrespective of the lighting situation provided by the normal lighting in the normal operation state. In addition, reducing the light intensity for lighting the emergency sign unit in the emergency operation state of the second operation mode compared to the normal operation state of the second operation mode allows reducing energy consumption in the emergency operation state.

The light source emitting light having the second light intensity corresponds to the light source emitting light at a second dimming level. The light source emitting light having the third light intensity corresponds to the light source emitting light at a third dimming level. The second dimming level is higher than the third dimming level.

The third light intensity may be equal to ten percent (10%) of the second light intensity.

The third dimming level may equal to a dimming level of ten percent (10%) and the second dimming level may equal to a dimming level of hundred percent (100%).

The control means may be configured to control the light emission of the light source according to the second operation mode such that in a normal operation state of the second operation mode the light source emits light having a luminance equal to or greater than 200 $cd/m^2$, and in the emergency operation state of the second operation mode the light source emits light having a luminance equal to or greater than 2 $cd/m^2$. The second light intensity is greater than the third light intensity.

In particular, in the second operation mode the control means may be configured to control the light emission of the light source according to the standard DIN4844 and/or standard EN1838.

The first light intensity may be greater than the third light intensity. Namely, for providing light to the environment, such as an escape route, in the emergency operation state (light source is operated according to the first operation mode), a greater light intensity may be required for sufficiently highlighting respectively lighting the escape route compared to the case of providing light for lighting the emergency sign unit in the emergency operation state (light source is operated according to the second operation mode).

Optionally, the first light intensity is different to the second light intensity.

The first dimming level and the second dimming level may each equal to a dimming level of hundred percent (100%), wherein the light intensity of the light emitted at the first dimming level may be different to the light intensity of the light emitted at the second dimming level.

The control means may be configured to control light emission of a second light source according to the first operation mode such that in the normal operation state and the emergency operation state of the first operation mode the second light source does not emit light. Further, the control means may be configured to control light emission of the second light source according to the second operation mode such that in the normal operation state of the second operation mode the second light source does not emit light, and in the emergency operation state of the second operation mode the second light source emits light having a fourth light intensity.

The second light source may be provided for emitting light to the environment. Therefore, the second light source may provide, when the emergency sign unit is attached to the emergency luminaire's housing, the initial function of the light source of the emergency luminaire. The initial function of the light source is present when no emergency sign unit is attached to the emergency luminaire's housing. In case no emergency sign unit is attached to the emergency luminaire, the light emitted by the emergency luminaire's light source already emits light to the environment. In this case the light of the second light source is not needed for providing light emission to the environment. Therefore, the control means may control the second light source to not emit light in the first operation mode irrespective whether the luminaire is operated in the emergency operation state or the normal operation state. This reduces energy consumption and saves costs.

In case the emergency sign unit is attached to the emergency luminaire's housing, the light source of the emergency luminaire is used for lighting the emergency sign unit. Thus, in this case the second light source may be used for providing the initial function of the light source, which is providing light emission to the environment in the emergency operation state (e.g. for lighting an escape route). Therefore, in the normal operation state of the second operation mode the second light source does not need to emit light for the reasons provided already above with regard to operation of the emergency luminaire's light source in the normal operation state of the first operation mode. This reduces energy consumption and saves costs. In addition, this prevents the normal operation state of the second operation mode persons being dazzled by light emitted from the second light source in. In the emergency operation state of the second operation mode, the environment is to be lighted by the second light source and, thus, the second light source may be controlled to emit light having the fourth light intensity in case the emergency operation state of the second operation mode is present.

The light source emitting light having the fourth light intensity corresponds to the light source emitting light at a fourth dimming level. The fourth dimming level may equal to a dimming level of hundred percent (100%).

The second light source may be configured to emit wide beam light. This allows illuminating the environment (e.g. a room in which the emergency luminaire is installed) with a wide beam light in the case of an emergency operation state, when an emergency sign unit is attached to the housing of the emergency luminaire. The wide beam light prevents dazzling of persons and, thus, prevents panic of the person in the case of the emergency operation state. Therefore, the wide beam light may also be referred to as anti-panic light.

The second light source may comprise or correspond to one or more light emitting diodes (LEDs). The one or more light emitting diodes of the second light source may be electrically supplied with a current (operating current). Thus, the control means of the emergency luminaire may be configured to control the one or more LEDs of the second light source by controlling the current supplied to the one or more LEDs. The one or more LEDs may correspond to one or more organic LEDs, one or more inorganic LEDs and/or one or more other LEDs known in the art. The light source may be configured to emit colored light, optionally light of at least two colors. The light source may comprise or correspond to at least one LED module comprising one or more LEDs. The second light source may comprise or correspond to a LED module comprising a plurality of LEDs. The second light source may comprise or correspond to an array of a plurality of LEDs. The second light source may comprise an optical arrangement comprising one or more lenses, optional one or more Fresnel lenses, for altering the light emitted by the one or more LEDs. The LEDs of the second light source may form one or more LED spots.

The one or more lenses may be arranged such that the direction of light emission of the second light source may be changed by rotating the one or more lenses. In a first position of the one or more lenses the light emitted by the second light source may be emitted in a first direction that is perpendicular to an light emission surface of the second light source. In a second position of the one or more lenses the light emitted by the second light source may be emitted in a second direction that is parallel to an light emission surface of the second light source.

Optionally, the housing of the emergency luminaire accommodates the second light source. The second light source may be arranged such that the second light source is configured to emit light to the environment when the emergency sign unit is attached to the housing. The electrical supply circuit of the emergency luminaire may be configured to electrically supply the second light source. The control means may be configured to control light emission of the second light source by controlling the electrical energy supply from the electrical supply circuit to the second light source. The above description with regard to the electrical energy supply of the light source from the electrical supply circuit is correspondingly valid for the electrical energy supply from the electrical supply circuit to the second light source.

In particular, the electrical supply circuit may comprise two outputs respectively two output channels, wherein one output of the two outputs is configured for electrically supplying the light source of the emergency luminaire and the second output is configured for electrically supplying the second light source. In particular, the electrical supply circuit is configured for independently supplying a first current to the light source and a second current to the second light source for independently controlling the light emission of the light source and the second light source.

Optionally, the electrical supply circuit comprises or corresponds to an operating module respectively ballast for operating lighting means (such as LEDs), wherein the operating module may be electrically connected to an electrical energy storage (e.g. the electrical energy storage of the luminaire) and to mains. The housing of the emergency luminaire accommodates such an operating module. The operating module may comprise two outputs (respectively output channels), wherein one output is configured to electrically supply, in particular a first current, to the light source and the other output is configured to electrically supply, in particular a second current, to the second light source. The control means of the emergency luminaire may be a part of the operating module. Optionally, the detection means are a part of the operating module. This operating module may correspond to an operating module with at least two outputs for electrically supplying lighting means, such as LEDs.

Optionally, the emergency sign unit comprises the second light source, and the housing of the emergency luminaire is configured for attaching the emergency sign unit to the housing such that the control means of the emergency luminaire is configured to control the light emission of the second light source according to the second operation mode, when the emergency sign unit is attached to the housing.

The housing of the emergency luminaire may be configured for attaching the emergency sign unit to the housing such that the electrical supply circuit of the emergency luminaire is configured to electrically supply the second light source when the emergency sign unit is attached to the housing.

Optionally, the fourth light intensity is equal to the first light intensity.

That is, the second light source may be configured to emit, in case of the emergency operation state of the second operation mode, light having the same light intensity as light that is emitted by the light source of the emergency luminaire in case of the emergency operation state of the first operation mode.

At least one of the first light intensity, the third light intensity and the fourth light intensity may be equal to the light intensity of the respective undimmed light source.

At least one of the first light intensity and the third light intensity may be equal to a maximum light intensity emittable by the light source. In addition or alternatively, the fourth light intensity may be equal to a maximum light intensity emittable by the second light source. At least one of the first dimming level, the third dimming level and the fourth dimming level may equal to a dimming level of hundred percent (100%).

In order to achieve the emergency luminaire according to the first aspect of the invention, some or all of the above described optional features may be combined with each other.

According to a second aspect of the invention, a method for controlling light emission of an emergency luminaire is provided. The emergency luminaire comprises a housing that accommodates a light source configured to emit light. The housing is configured for attaching an emergency sign unit to the housing such that the light emitted by the light source lights the emergency sign unit when the emergency sign unit is attached to the housing. The method comprises determining whether the emergency sign unit is attached to the housing or not. Further, the method comprises controlling a light emission of the light source according to a first operation mode when no emergency sign unit is attached to the housing, and according to a second operation mode when the emergency sign unit is attached to the housing. The second operation mode is different from the first operation mode.

The above description with regard to the emergency luminaire according to the first aspect of the invention is also valid for the method according to the second aspect of the invention.

The housing of the emergency luminaire may accommodate detection means for detecting attachment of the emergency sign unit to the housing. The method may comprise determining, using the detection means, whether the emergency sign unit is attached to the housing or not.

Optionally, the detection means comprises or corresponds to two electrical contacts that are configured to be electrically connected to each other by an electrical conductive element of the emergency sign unit, when the emergency sign unit is attached to the housing. The method may comprise determining that the emergency sign unit is attached to the housing when the two electrical contacts are electrically connected to each other.

Optionally, the detection means is configured to detect using electromagnetic induction a near field communication (NFC) tag, a metal element and/or a magnetic element of the emergency sign unit, when the emergency sign unit is attached to the housing. The method may comprise determining that the emergency sign unit is attached to the housing when the detection means detects the NFC tag, the metal element and/or the magnetic element of the emergency sign unit.

In particular, the method may comprise controlling the light emission of the light source according to the first operation mode such that in a normal operation state of the first operation mode the light source does not emit light, and in an emergency operation state of the first operation mode the light source emits light having a first light intensity.

Further, the method may comprise controlling the light emission of the light source according to the second operation mode such that in a normal operation state of the second operation mode the light source emits light having a second light intensity, and in the emergency operation state of the second operation mode the light source emits light having a third light intensity. The second light intensity is greater than the third light intensity.

The method may comprise controlling light emission of a second light source according to the first operation mode such that in the normal operation state and the emergency operation state of the first operation mode the second light source does not emit light. Further, the method may comprise controlling light emission of the second light source according to the second operation mode such that in the normal operation state of the second operation mode the second light source does not emit light, and in the emergency operation state of the second operation mode the second light source emits light having a fourth light intensity.

The housing of the emergency luminaire may accommodate the second light source.

The emergency sign unit may comprise the second light source, and the housing of the emergency luminaire may be configured for attaching the emergency sign unit to the housing such that the light emission of the second light source may be controlled according to the second operation mode, when the emergency sign unit is attached to the housing.

Control means of the emergency luminaire may perform at least one of the method steps described above.

The method according to the second aspect of the invention achieves the same advantages as the emergency luminaire according to the first aspect of the invention.

The emergency luminaire may be implemented according to the emergency luminaire of the first aspect of the invention described above. In other words, the emergency luminaire may correspond to the emergency luminaire of the first aspect of the invention as described above.

In order to achieve the method according to the second aspect of the invention, some or all of the above described optional features may be combined with each other.

According to third aspect of the invention, an emergency sign unit for an emergency luminaire is provided. The emergency luminaire comprises a housing that accommodates a light source configured to emit light. The emergency sign unit comprises an electrical conductive element. The emergency sign unit is configured to be attached to the housing of the emergency luminaire such that the light emitted by the light source of the emergency luminaire lights the emergency sign unit, and the electrical conductive element of the emergency sign unit electrically connects two electrical contacts of detection means of the emergency luminaire when the emergency sign unit is attached to the housing.

The above description with regard to the emergency luminaire according to the first aspect of the invention is also valid for the emergency sign unit according to the third aspect of the invention. In particular, the above description of the emergency sign unit attachable to the emergency luminaire according to the first aspect of the invention is valid for the emergency sign unit according to the third aspect of the invention.

The emergency sign unit according to the third aspect of the invention achieves the same advantages as the emergency luminaire according to the first aspect of the invention.

The emergency luminaire may be implemented according to the emergency luminaire of the first aspect of the invention as described above. In other words, the emergency luminaire may correspond to the emergency luminaire of the first aspect of the invention as described above.

BRIEF DESCRIPTION OF THE DRAWINGS

In the following, the invention is described exemplarily with reference to the enclosed figures, in which.

DETAILED DESCRIPTION OF THE EMBODIMENT

In the figures, corresponding elements have the same reference signs. The proportions and dimensions of the elements shown in the figures do not represent the emergency luminaire and the emergency sign unit to scale, but are merely chosen to describe the structure and function of the emergency luminaire.

Figure 1:
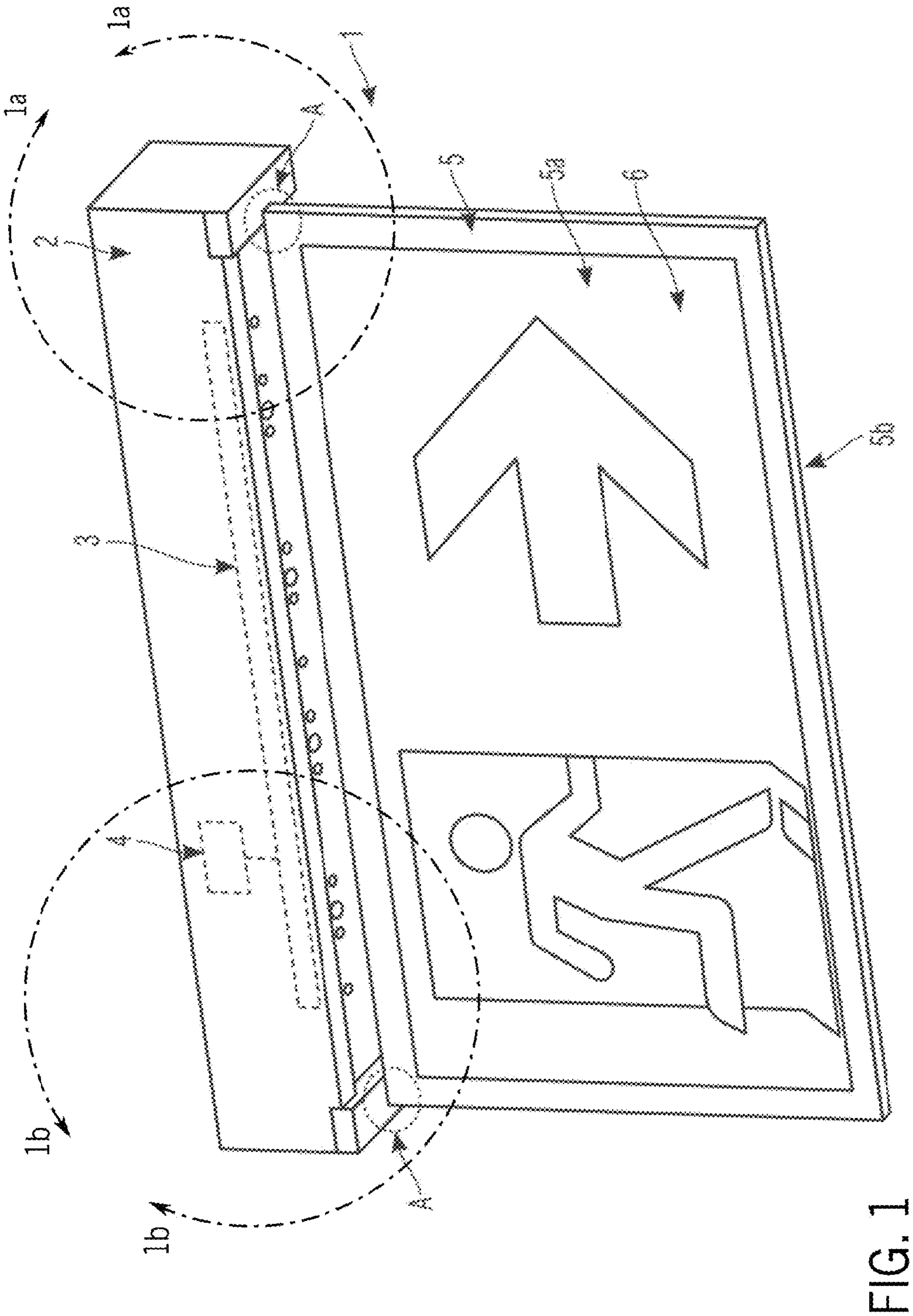
FIG. 1 is a schematic view of an emergency luminaire according to an embodiment of the invention.
Figure 1A:
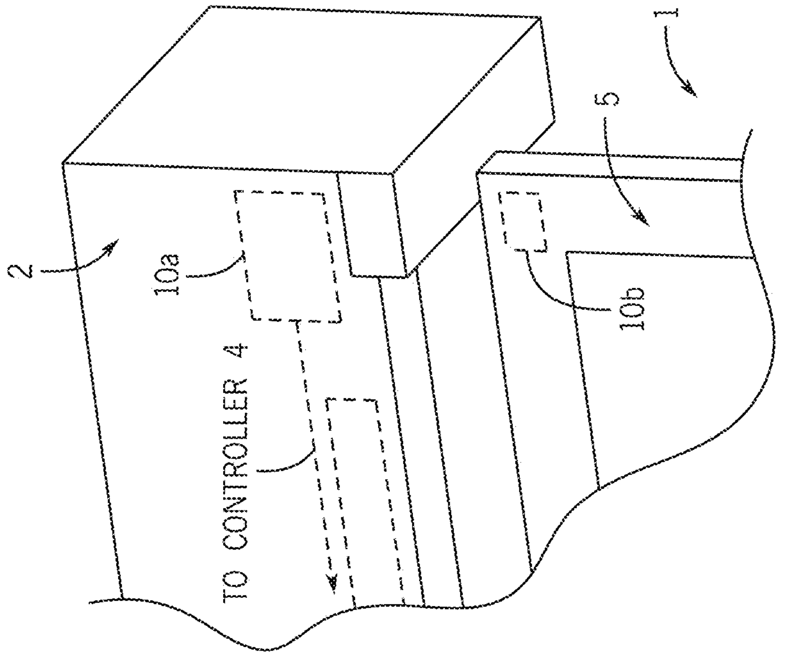
FIG. 1*a* is a detailed view of the region labelled 1*a*-1*a* in FIG. 1.

FIG. 1 is a schematic view of an emergency luminaire according to an embodiment of the invention. In particular, FIG. 1 shows an example of the emergency luminaire according to the first aspect of the invention as described above for the case that an emergency sign unit is attached to the housing of the emergency luminaire.

As shown in FIG. 1, the emergency luminaire 1 comprises a housing 2, a light source 3 configured to emit light, and control means 4 configured to control light emission of the light source 3. The housing 2 accommodates the light source 3 and the control means 4. In particular, the control means 4 may be configured to control the light emission of the light source 3 by controlling the electrical energy supply from an electrical supply circuit of the emergency luminaire 1 to the light source 3 of the emergency luminaire 1 (not shown in FIG. 1).

The housing 2 is configured for attaching an emergency sign unit 5 to the housing such that the light emitted by the light source 3 lights the emergency sign unit 5 when the emergency sign unit 5 is attached to the housing 2. The housing 2 may be configured for detachably attaching the emergency sign unit 5 to the housing 2. FIG. 1 shows the case in which the emergency sign unit 5 is already attached to the housing 2. Thus, the emergency luminaire 1 shown in FIG. 1 may be also referred to as emergency sign luminaire.

The housing 2 may comprise two attachment openings in its surface for attaching the emergency sign unit 5 to the housing. In this case, two attachments parts (i.e. corresponding attachment means) of the emergency sign unit 5 may be at least partly arranged in the two attachment openings of the housing 2 (cf. regions indicated by the dashed circles A in FIG. 1) to form at least one of a click connection, snap-in connection and slide-in connection. This allows attaching the emergency sign unit 5 to the housing 2. This attachment is only by way of example and does not limit the invention. Therefore, the housing 2 may be configured by any other way known in the art for attaching the emergency sign unit 5 to the housing 2.

As shown in FIG. 1, the emergency sign unit 5 may correspond to an at least partly translucent plate with at least one emergency sign 6 (e.g. escape route sign) on at least one surface 5*a* of the plate 5. The housing 2 is configured to attach the plate 5 to the housing 2 such that the at least one emergency sign 6 is lighted by the light emitted from the light source 3, when the plate 5 is attached to the housing 2. In particular, the plate 5 may be a light guide plate that is configured to be attached to the housing 2 such that light emitted by the light source 3 of the emergency luminaire 1 is emitted through the light guide plate 5. The light emitted through the light guide plate 5 lights the at least one emergency sign 6 of the at least one surface 5*a* of the plate 5. The emergency sign unit 5 is not limited to the implementation form shown in FIG. 1 and, thus, may be implemented according to any other way known in the art.

Figure 1B:
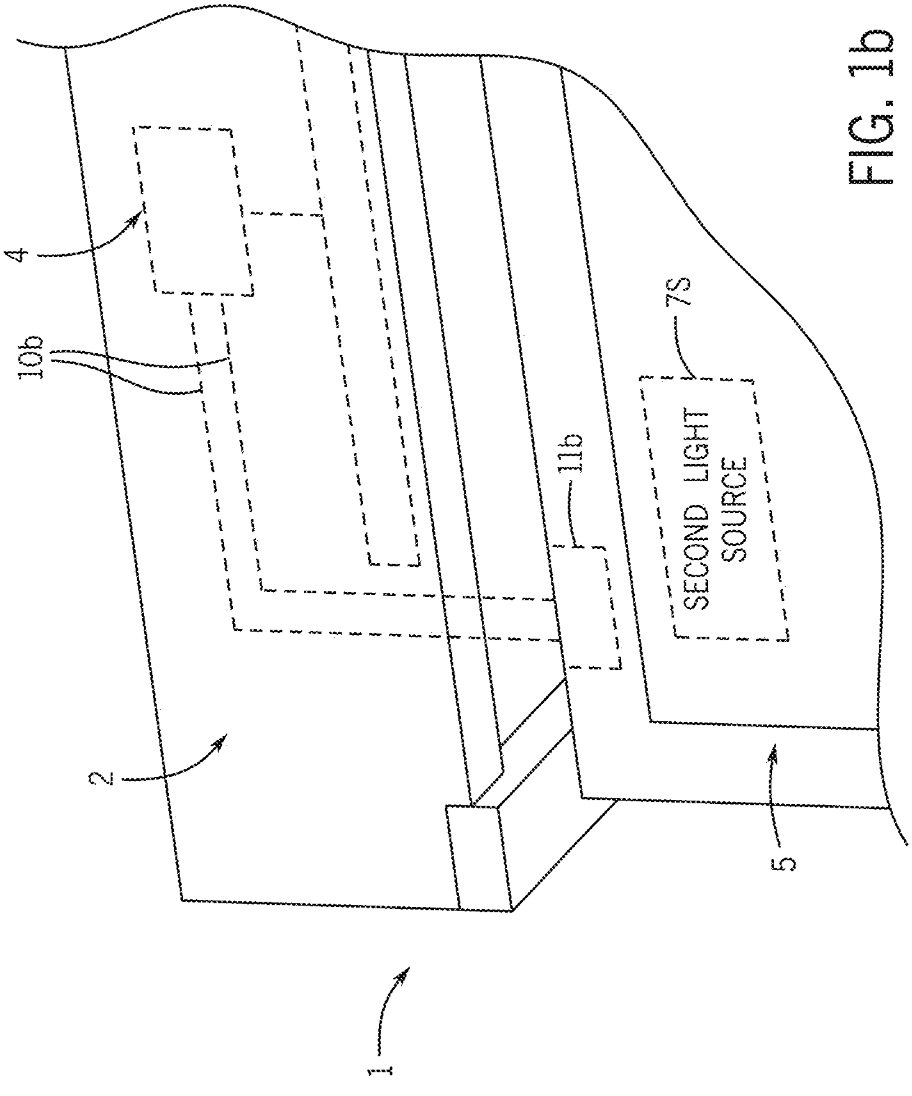
FIG. 1*b* is a detailed view of the region labelled 1*b*-1*b* in FIG. 1.

Optionally, either the housing 2 of the emergency luminaire 1 may accommodate a second light source or the emergency sign unit 5 may comprise the second light source (not shown in FIG. 1 but see second light source 7S in FIG. 1*b*). For example, the second light source may be arranged on a side 5*b* of the emergency light unit 5, which is opposite to a side of the emergency sign unit 5 that faces the housing 2 when the emergency sign unit 5 is attached to the housing 2. In particular, the side 5*b* may correspond to a side (underside respectively bottom side) facing the ground, when the housing 2 of the emergency luminaire 1 is installed at a ceiling of a room such that the light emitted by the light source 3 is emitted in the direction of the ground and when the emergency sign unit 5 is attached to the housing 2. The second light source may be differently arranged at the emergency sign unit 5 as long as the second light source is configured to provide light emission to the environment when the emergency sign unit 5 is attached to the housing 2.

The control means 4 may be configured to control the light emission by the second light source. In particular, in case the emergency sign unit 5 comprises the second light source, the control means 4 may be configured to control the light emission by the second light source, when the emergency sign unit 5 is attached to the housing 2 of the emergency luminaire 1. The electrical supply circuit of the emergency luminaire 1 may be configured to electrically supply the second light source.

In the following the control of the light source 3 of the emergency luminaire 1 and the optional second light source (not shown in FIG. 1) by the control means 4 is described.

The control means 4 is configured to determine whether the emergency sign unit 5 is attached to the housing 2 or not. For this, the housing 2 may accommodate detection means for detecting attachment of the emergency sign unit 5 to the housing 2 (not shown in FIG. 1). In particular, the detection means may be arranged at an area of the housing at which the emergency sign unit 5 may be attached to the housing 2. The control means 4 may be configured to determine, using the detection means, whether the emergency sign unit 5 is attached to the housing 2 or not.

According to an alternative, the detection means may comprise or correspond to two electrical contacts that are configured to be electrically connected to each other by an electrical conductive element of the emergency sign unit 5, when the emergency sign unit is attached to the housing 2. The electrical conductive element may be a part of the one or more attachment parts (i.e. attachment means) of the emergency sign unit 5 for attaching the emergency sign unit 5 to the housing 2 of the emergency luminaire 1. For example, the one or more attachment parts of the emergency sign unit 5 may be at least partly arranged in one or more attachment openings of the housing 2 for attaching the emergency sign unit 5 to the housing 2. The control means 4 may be configured to determine that the emergency sign unit 5 is attached to the housing 2 when the two electrical contacts are electrically connected by the electrical conductive element of the emergency sign unit 5 to each other.

According to another alternative, the detection means may be configured to detect using electromagnetic induction a near field communication (NFC) tag, a metal element and/or a magnetic element of the emergency sign unit 5, when the emergency sign unit 5 is attached to the housing 2. The control means 4 may be configured to determine that the emergency sign unit 5 is attached to the housing 2 when the detection means detects the NFC tag, the metal element and/or the magnetic element of the emergency sign unit 5.

The control means 4 is configured to control the light emission of the light source 3 and optionally the light emission of the optional second light source (not shown in FIG. 1) according to a first operation mode when no emergency sign unit 5 is attached to the housing 2, and according to a second operation mode when the emergency sign unit is attached to the housing 2. The second operation mode is different from the first operation mode. Therefore, in the case of FIG. 1, the control means 4 controls the light emission of the light source 3 and optionally the light emission of the optional second light source according to the second operation mode, because the emergency sign unit 5 is attached to the housing 2 of the emergency luminaire 1. In case of detaching the emergency sign unit 5 from the housing 2 (not shown in FIG. 1), the control means 4 controls the light emission of the light source 3 and optionally the light emission of the optional second light source according to the first operation mode.

Thus, the control means 4 is configured to switch between the first operation mode and the second operation mode for controlling the light emission of the light source 3 and optionally the light emission of the optional second light source, depending on whether the emergency sign unit 5 is attached to the housing 2 or not. In case the control means determine that no emergency sign unit 5 is attached to the housing 2, the control means 4 controls the light emission of the light source 3 and optionally the light emission of the optional second light source according to the first operation mode. In case the control means 4 determines that the emergency sign unit 5 is attached to the housing 2, the control means 4 controls the light emission of the light source 3 and optionally the light emission of the optional second light source according to the second operation mode.

The control means 4 may be configured to control the light emission of the light source 3 according to the first operation mode such that in a normal operation state of the first operation mode the light source 3 does not emit light, and in an emergency operation state of the first operation mode the light source 3 emits light having a first light intensity. In other words, in the first operation mode (i.e. when no emergency sign unit 5 is attached to the housing 2), the control means 4 may be configured to control the light emission of the light source 3 such that the emergency luminaire behaves as a normal emergency luminaire. As a result, in the first operation mode the light source 3 is controlled to emit light only in the emergency operation state.

The control means 4 may be configured to control the light emission of the light source 3 according to the second operation mode such that in a normal operation state of the second operation mode the light source emits light having a second light intensity, and in the emergency operation state of the second operation mode the light source 3 emits light having a third light intensity. The second light intensity is greater than the third light intensity. In other words, in the second operation mode (i.e. when the emergency sign unit 5 is attached to the housing 2) the control means 4 may be configured to control the light emission of the light source 3 such that the emergency luminaire behaves as an emergency sign luminaire. As a result, in the second operation mode the light source 3 is controlled to emit light in the normal operation state and the emergency operation state, but with different light intensities for the two operation states for the reasons described already above with respect to the emergency luminaire of the first aspect.

The third light intensity may be equal to ten percent (10%) of the second light intensity. Optionally, the first light intensity is different to the second light intensity. The first light intensity may be greater than the third light intensity.

The control means 4 may be configured to control the light emission of the optional second light source according to the first operation mode such that in the normal operation state and the emergency operation state of the first operation mode the second light source does not emit light. This is the case, when the housing 2 accommodates the second light source. The second light source may be used by the emergency luminaire for providing the initial function of the light source 3 when the emergency sign unit 5 is attached to the housing 2. This initial function is lighting the environment of the emergency luminaire 2. When the emergency sign unit 5 is attached to the housing 2, the light emitted by the light source 3 lights the emergency sign unit 5 and, thus, does not light anymore the environment. Therefore, in this case (i.e. the second operation mode) the second light source is to provide the initial function of the light source 3 of the emergency luminaire 1. In the other case (i.e. no emergency sign unit 5 attached to the housing 2 respectively the first operation mode) the light source 3 provides its initial function and, thus, the second light source is controlled to not emit light.

Further, the control means 4 may be configured to control light emission of the second light source according to the second operation mode such that in the normal operation state of the second operation mode the second light source does not emit light, and in the emergency operation state of the second operation mode the second light source emits light having a fourth light intensity. Thus, the control means 4 may be configured to control the light emission of the second light source according to the second operation mode in the same way as the control of the light source 3 according to the first operation mode. The first light intensity and the fourth light intensity may be equal to each other.

At least one of the first light intensity, the third light intensity and the fourth light intensity may be equal to the light intensity of the respective undimmed light source.

For further details of the emergency luminaire 1 and the emergency sign unit 5 of FIG. 1 reference is made to the above description of the emergency luminaire according to the first aspect of the invention and the emergency sign unit according to the third aspect of the invention.

Figure 2:
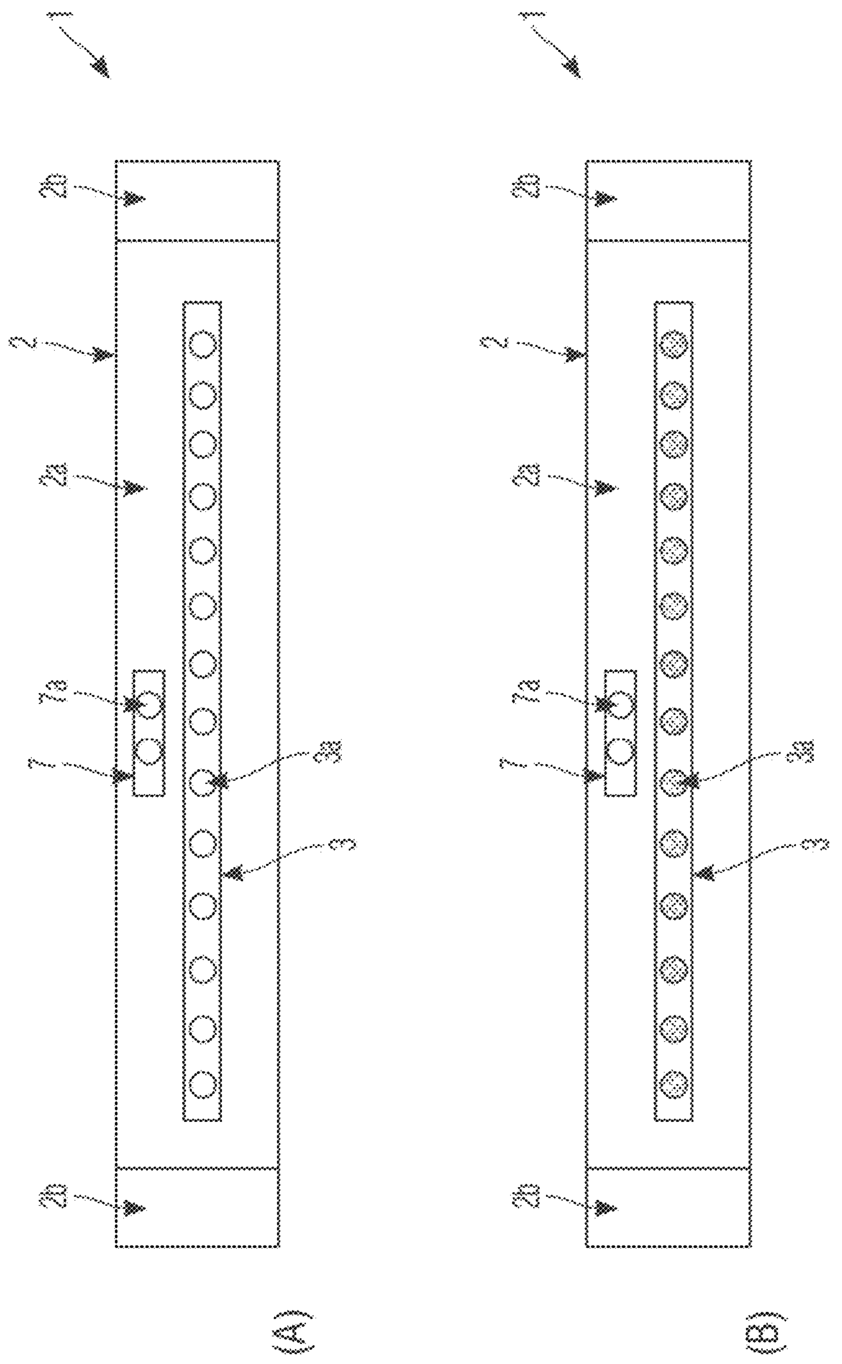
FIG. 2 schematically shows two states of a light source and an optional second light source of an emergency luminaire according to an embodiment of the invention in case no emergency sign unit is attached to the housing of the emergency luminaire.

FIG. 2 schematically shows two states of a light source and an optional second light source of an emergency luminaire according to an embodiment of the invention in case no emergency sign unit is attached to the housing of the emergency luminaire.

The emergency luminaire 1 of FIG. 2 is an implementation form of the emergency luminaire 1 of FIG. 1. Therefore, the above description of FIG. 1 is correspondingly valid for the emergency luminaire 1 of FIG. 2 and in the following mainly additional optional features of the emergency luminaire 1 of FIG. 2 are described.

As shown in FIG. 2, the housing 2 of the emergency luminaire 1 accommodates the light source 3 and the second light source 7. The light source 3 corresponds to a strip of a plurality of light emitting diodes 3*a* (LEDs), which may be referred to as LED strip. The second light source 7 also correspond to a strip with a plurality of LEDs 7*a*. The number of LEDs 3*a* of the light source 3 is greater than the number of LEDs 7*a* of the second light source. The implementation form of the light source 3 and the second light source 7 as well as the number of LEDs of the light sources is only by way of example and does not limit the invention. Therefore, the light source 3 and/or the second light source 7 may be differently implemented by any way known in the art. The light source 3 and the second light source 7 may be arranged in a chamber 2*a* (respectively cavity) of the housing 2. This chamber may be sealed for providing protection, optionally IP protection, against environmental influences, such as water and dust.

As indicated in FIG. 2A, the housing 2 may comprise two attachment areas 2*b* for attaching the emergency sign unit 5 to the housing 2. For example, each attachment area 2*b* may comprise at least one attachment opening, wherein a corresponding attachment part of the emergency sign unit 5 may be at least partly arranged in the at least one attachment opening for attaching the emergency sign unit 5 to the housing 2. This is only by way of example and does not limit the invention. Therefore, the housing 2 may be configured by any other way known in the art for attaching the emergency sign unit 5 to the housing 2.

The FIGS. 2 (A) and (B) show two states of light emission of the light source 3 and the second light source 7 in case no emergency sign unit 5 is attached to the housing and, thus, the control means 4 controls the light emission of the two light sources according to the first operation mode. As a result, the emergency luminaire 1 behaves as a normal emergency luminaire.

FIG. 2 (A) shows the normal operation state of the first operation mode. Thus, the light source 3 and the second light source 7 are controlled by the control means 4 to not emit light (in the normal operation state of the first operation mode). FIG. 2 (B) shows the emergency operation state of the first operation mode. Thus, the light source 3 is controlled by the control means 4 to emit light for lighting the environment of the emergency luminaire 1 (in the emergency operation state of the first operation mode). The light emission is indicated in FIG. 2 (B) by the dotted pattern in the circles representing the LEDs 3*a* of the light source 3. The second light source 7 is controlled by the control means 4 to not emit light (in the emergency operation state of the first operation mode). Thus, in the first operation mode the control means 4 controls the second light source 7 to not emit light.

For further details of the emergency luminaire 1 of FIG. 2 reference is made to the above description of the emergency luminaire according to the first aspect of the invention and the above description of the emergency luminaire 1 of FIG. 1.

Figure 3:
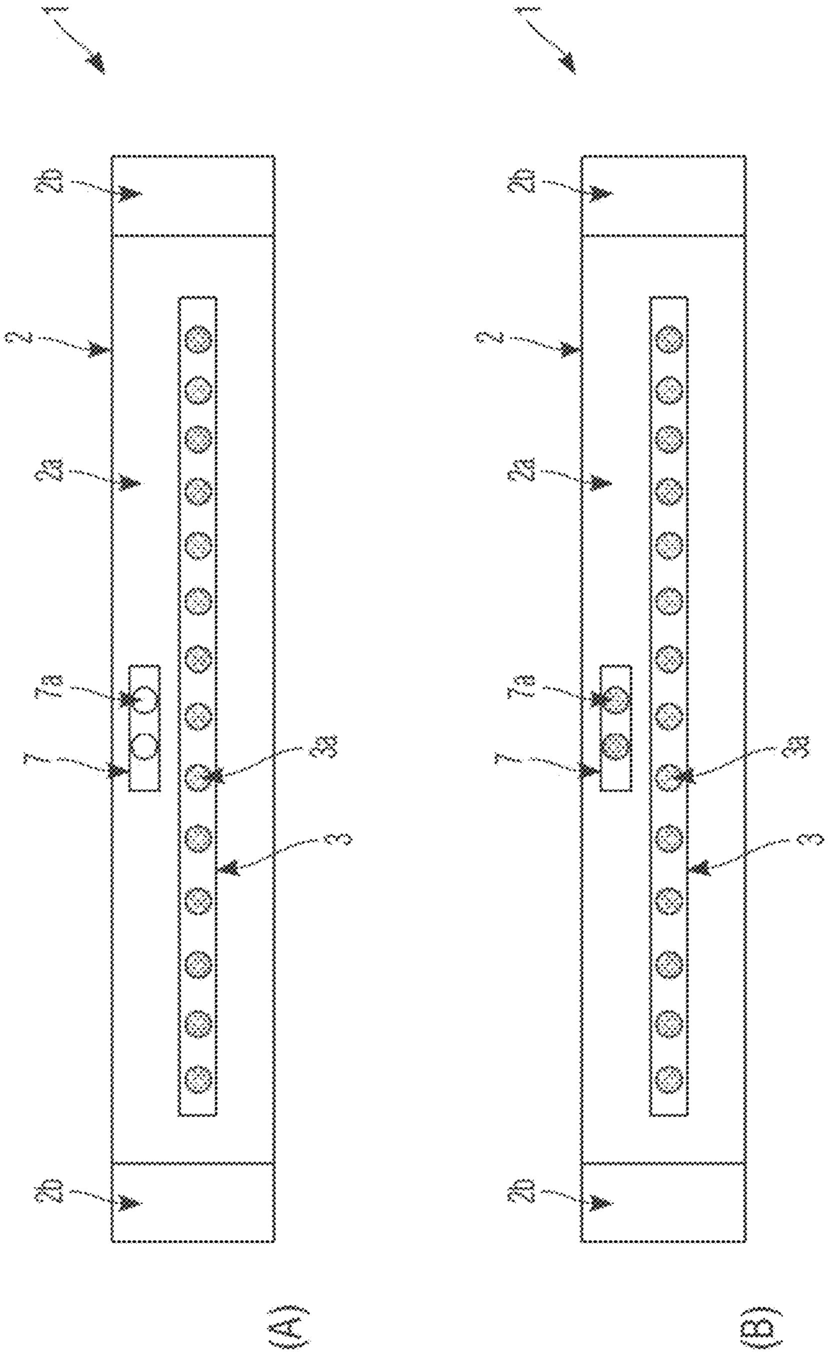
FIG. 3 schematically shows two states of a light source and an optional second light source of an emergency luminaire according to an embodiment of the invention in case an emergency sign unit is attached to the housing of the emergency luminaire.

FIG. 3 schematically shows two states of a light source and an optional second light source of an emergency luminaire according to an embodiment of the invention in case an emergency sign unit is attached to the housing of the emergency luminaire.

The emergency luminaire 1 of FIG. 3 corresponds to the emergency luminaire 1 of FIG. 2. Therefore, the above description of FIGS. 1 and 2 is correspondingly valid for the emergency luminaire 1 of FIG. 2 and in the following two additional states of the emergency luminaire 1 are described. The light emission of a respective light source is indicated in FIG. 3 by the dotted pattern in the circles representing the LEDs of the respective light source.

The FIGS. 3 (A) and (B) show two states of light emission of the light source 3 and the second light source 7 in case the emergency sign unit 5 is attached to the housing 2 and, thus, the control means 4 controls the light emission of the two light sources according to the second operation mode. As a result, the emergency luminaire 1 behaves as an emergency sign luminaire, wherein the second light source 7 provides the function of a normal emergency luminaire.

FIG. 3 (A) shows the normal operation state of the second operation mode. Thus, the light source 3 is controlled by the control means 4 to emit light for lighting the emergency sign unit 5 (in the normal operation state of the second operation mode). The second light source 7 is controlled by the control means 4 to not emit light (in the normal operation state of the second operation mode). FIG. 3 (B) shows the emergency operation state of the second operation mode. Thus, the light source 3 is controlled by the control means 4 to emit light for lighting the emergency sign unit 5 (in the emergency operation state of the second operation mode). The light intensity of the light emitted by the light source 3 in the normal operation state is greater than the light intensity of the light emitted by the light source 3 in the emergency operation state. The second light source 7 is controlled by the control means 4 to emit light for lighting the environment of the emergency luminaire 1 (in the emergency operation state of the second operation mode). The light intensity of the light emitted by the second light source 7 in the emergency operation state of the second operation mode may be equal to the light intensity of the light emitted by the light source 3 in the emergency operation state of the first operation mode.

For further details of the emergency luminaire 1 of FIG. 3 reference is made to the above description of the emergency luminaire according to the first aspect of the invention and the above description of the emergency luminaire 1 of FIGS. 1 and 2.

All steps which are performed by the various entities described in the present disclosure as well as the functionalities described to be performed by the various entities are intended to mean that the respective entity is adapted to or configured to perform the respective steps and functionalities. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. An emergency luminaire (1) with a housing (2), the housing (2) accommodating a light source (3) configured to emit light, and control means (4) configured to control light emission of the light source (3); wherein the housing (2) is configured for attaching an emergency sign unit (5) to the housing (2) such that the light emitted by the light source (3) lights the emergency sign unit (5) when the emergency sign unit (5) is attached to the housing (2);

the control means (4) is configured to determine whether the emergency sign unit (5) is attached to the housing (2) or not; and the control means (4) is configured to control the light emission of the light source (3)

according to a first operation mode when no emergency sign unit (5) is attached to the housing (2), and according to a second operation mode when the emergency sign unit (5) is attached to the housing (2), wherein the second operation mode is different from the first operation mode.

2. The emergency luminaire (1) according to claim 1, wherein the housing (2) accommodates detection means for detecting attachment of the emergency sign unit (5) to the housing (2), the control means (4) is configured to determine, using the detection means, whether the emergency sign unit (5) is attached to the housing (2) or not.

3. The emergency luminaire (1) according to claim 2, wherein the detection means comprises or corresponds to two electrical contacts that are configured to be electrically connected to each other by an electrical conductive element of the emergency sign unit (5), when the emergency sign unit (5) is attached to the housing (2), and the control means (4) is configured to determine that the emergency sign unit (5) is attached to the housing (2) when the two electrical contacts are electrically connected to each other.

4. The emergency luminaire (1) according to claim 2, wherein the detection means is configured to detect using electromagnetic induction a near field communication, NFC, tag, a metal element and/or a magnetic element of the emergency sign unit (5), when the emergency sign unit (5) is attached to the housing (2), and the control means (4) is configured to determine that the emergency sign unit (5) is attached to the housing (2) when the detection means detects the NFC tag, the metal element and/or the magnetic element of the emergency sign unit (5).

5. The emergency luminaire (1) according to claim 1, wherein the control means (4) is configured to control the light emission of the light source (3) according to the first operation mode such that in a normal operation state of the first operation mode the light source (3) does not emit light, and in an emergency operation state of the first operation mode the light source (3) emits light having a first light intensity.

6. The emergency luminaire (1) according to claim 1, wherein the control means (4) is configured to control the light emission of the light source (3) according to the second operation mode such that in a normal operation state of the second operation mode the light source (3) emits light having a second light intensity, and in the emergency operation state of the second operation mode the light source (3) emits light having a third light intensity; wherein the second light intensity is greater than the third light intensity.

7. The emergency luminaire (1) according to claim 6, wherein the third light intensity is equal to ten percent, 10%, of the second light intensity.

8. The emergency luminaire (1) according to claim 6, wherein the first light intensity is different from the second light intensity.

9. The emergency luminaire (1) according to claim 1, wherein the control means (4) is configured to control light emission of a second light source (7) according to the first operation mode such that in the normal operation state and the emergency operation state of the first operation mode the second light source (7) does not emit light; and according to the second operation mode such that in the normal operation state of the second operation mode the second light source (7) does not emit light, and in the emergency operation state of the second operation mode the second light source (7) emits light having a fourth light intensity.

10. The emergency luminaire (1) according to claim 9, wherein the housing (2) of the emergency luminaire (1) accommodates the second light source (7).

11. The emergency luminaire (1) according to claim 9, wherein the emergency sign unit (5) comprises the second light source (7), and the housing (2) of the emergency luminaire (1) is configured for attaching the emergency sign unit (5) to the housing (2) such that the control means (4) of the emergency luminaire (1) is configured to control the light emission of the second light source (7) according to the second operation mode, when the emergency sign unit (5) is attached to the housing (2).

12. The emergency luminaire (1) according to claim 9 wherein the fourth light intensity is equal to the first light intensity.

13. The emergency luminaire (1) according to claim 5, wherein at least one of the first light intensity, the third light intensity and the fourth light intensity is equal to the light intensity of the respective undimmed light source.

14. A method for controlling light emission of an emergency luminaire (1), the emergency luminaire (1) comprising a housing (2) that accommodates a light source (3) configured to emit light; wherein the housing (2) is configured for attaching an emergency sign unit (5) to the housing (2) such that the light emitted by the light source (3) lights the emergency sign unit (5) when the emergency sign unit (5) is attached to the housing (2);

the method comprises:

determining whether the emergency sign unit (5) is attached to the housing (2) or not; and controlling a light emission of the light source (3)

according to a first operation mode when no emergency sign unit (5) is attached to the housing (2), and according to a second operation mode when the emergency sign unit (5) is attached to the housing (2), wherein the second operation mode is different from the first operation mode.

* * * * *